United States Patent [19]
McNulty

[11] Patent Number: 5,397,181
[45] Date of Patent: Mar. 14, 1995

[54] COMPRESSOR DISCHARGE TEMPERATURE SENSING SYSTEM

[75] Inventor: Michael McNulty, Mason, Ohio

[73] Assignee: General Electric Company, Cincinnati, Ohio

[21] Appl. No.: 139,133

[22] Filed: Oct. 21, 1993

[51] Int. Cl.$^6$ .................. G01K 1/14; G01K 13/02
[52] U.S. Cl. .................. 374/144; 374/148; 60/39.091; 73/117.3
[58] Field of Search .......... 374/144, 147, 148, 208; 73/117.3; 60/39.091, 39.093

[56] References Cited

U.S. PATENT DOCUMENTS

| | | | |
|---|---|---|---|
| 2,741,919 | 4/1956 | Gaubatz. | |
| 3,167,960 | 2/1965 | Miesiak. | |
| 3,597,920 | 8/1971 | Wadman | 374/144 |
| 4,047,379 | 9/1977 | Brookes et al. | 374/144 |
| 4,055,997 | 11/1977 | Kniat | 374/144 |
| 4,744,670 | 5/1988 | Janssen | 374/144 |
| 4,786,188 | 11/1988 | Myhre et al. | 374/144 |
| 4,829,813 | 5/1989 | Syed | 73/116 |
| 4,934,137 | 6/1990 | MacKay | 60/39.33 |
| 5,018,873 | 5/1991 | Bobo | 374/144 |

FOREIGN PATENT DOCUMENTS 0752775  7/1956  United Kingdom ............... 374/147

*Primary Examiner*—Diego F. F. Guiterrez
*Attorney, Agent, or Firm*—Jerome C. Squillaro; Bernard E. Shay

[57] ABSTRACT

A compressor discharge temperature sensing system senses compressor discharge temperature for a compressor located within a housing. A sensor mounted external to the flow path receives high pressure air discharged from the compressor. The high pressure air flows past at least one thermocouple in the housing and through a purge line. The thermocouple measures the high pressure air temperature and the high pressure air is then returned to the flow path.

10 Claims, 1 Drawing Sheet

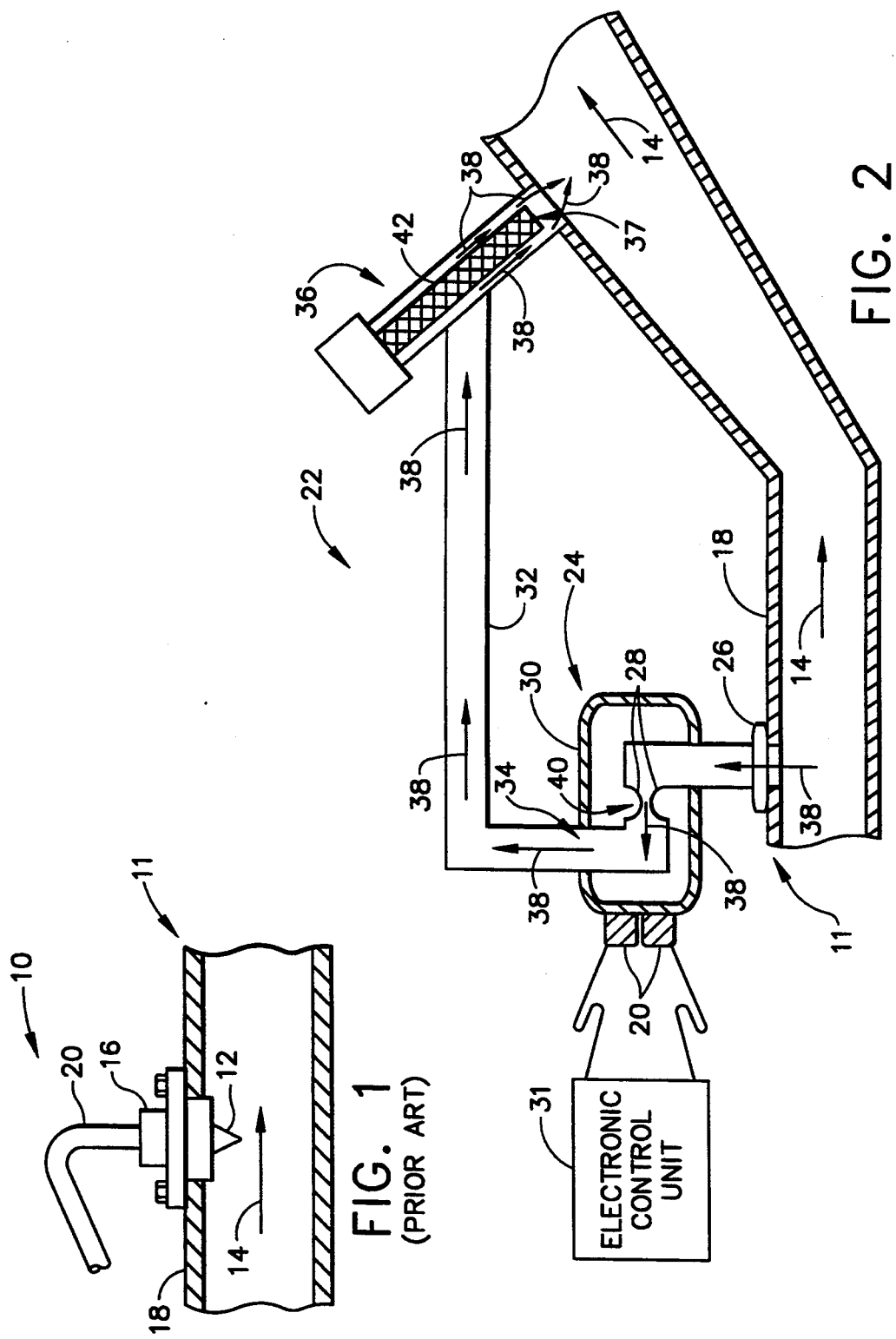

COMPRESSOR DISCHARGE TEMPERATURE SENSING SYSTEM

BACKGROUND OF THE INVENTION

The present invention relates to aircraft engine systems and, more particularly, to a compressor discharge temperature (T3) sensing system as the baseline production design for a turbo-fan engine.

Existing systems used to measure T3, i.e., compressor discharge, air flow are primarily thermocouple sensors mounted in the compressor flow stream. These sensors require access into the flow path through the compressor case. Unfortunately, this exposes the engine turbomachinery to potential mechanical failures of the sensor which could cause it to fall into the flow path. Additionally, the relatively slow air velocity into the compressor discharge area causes the sensor to have a relatively long time constant. This long time constant leads to significant inaccuracies, on the order of 10–15%, in measuring the air temperature during critical transient maneuvers of the aircraft engine. The maximum acceptable inaccuracy is approximately 2–3% during engine transients.

Compressor discharge temperature is critical in certain situations, such as in staging a dual annular combustor for a high bypass turbofan commercial jet engine. Specifically, the T3 measurement is used in calculating air flow into the combustor. The staging strategy is based in part on the combustor fuel-to-air flow ratio. The staging of the combustor is critical to meet the engine operability needs, i.e., flameout margin, and emissions goals.

It is therefore highly desirable and an object of the present invention to provide a T3 sensing system which provides improved compensation and may be mounted external to the flow path.

Another object of the present invention is to provide such a T3 sensing system wherein access into the direct flow path is not required.

Another object of the present invention is to provide a more accurate transient T3 signal.

These objects and other features and advantages will become more readily apparent in the following description when taken in conjunction with the appended drawings.

SUMMARY OF THE INVENTION

The present invention has been developed to fulfill the needs noted above. The present invention is a T3 sensing system mounted external to the flow path. The system extracts air from the compressor discharge plane through a hole bored into the case. The air is ported into a housing containing the thermocouples which measure the air temperature. The thermocouples send an electrical signal to the electronic control unit (ECU) indicating the air temperature. The air is then vented to a sink pressure and can be used as cooling or purge flow.

In accordance with an alternative embodiment of the present invention, the exit flow is not restricted to use as a pyrometer purge flow, but could be used as motive flow for an ejector. The ejector could draw in cooler undercowl temperature air and be used as a cooling flow for another component.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

FIG. 1 is a cross-sectional view illustrating installation into a flow path of a prior art T3 sensor system; and FIG. 2 is a schematic diagram illustrating a T3 sensor system in accordance with the present invention.

DETAILED DESCRIPTION OF THE PREFERRED EMBODIMENTS

Referring now to the drawings, in FIG. 1 there is illustrated a cross-section of a prior art T3 sensing system 10, which includes a partial cross-section of a compressor 11. The sensing system 10 includes a T3 sensor 12 situated in the compressor air flow path 14. A mounting means 16 is used to bolt or otherwise install the T3 sensor 12 to compressor casing 18 of a jet engine.

The T3 sensor 12, typically a thermocouple sensor, sends an electrical signal to an electronic control unit (ECU) (not shown) via leads 20, which is capable of indicating the air temperature. As can be seen in FIG. 1, the T3 sensor 12 requires access into the flow path 14 through the compressor case 18. This can create particular problems when access to the flow path requires drilling through several inches of outer and inner casings of the compressor 11.

Referring now to FIG. 2, a T3 sensor system 22 having a T3 sensor means 24, is illustrated, in accordance with the present invention. The T3 sensor system 22 does not require access into the direct flow path 14, so engine turbo machinery is not exposed to potential mechanical failures of the sensor which can cause the sensor to fall into the flow path.

The T3 sensor means 24 is mounted to the compressor casing 18 on a mounting pad 26. The mounting pad 26 is situated at the high pressure compressor discharge area, which is the location at which the highest pressure in the engine cycle occurs. An aperture (not shown) is drilled into the compressor casing 18 at this location, and the T3 sensor means 24 is mounted over this aperture.

The sensor means 24 preferably comprises at least one thermocouple 28, and is contained in a sensor housing 30. The sensor means 24 sends an electrical signal to the electronic control unit (ECU) 31 via leads 20, capable of indicating the air temperature.

A tube or purge line 32 is connected to outlet 34 of sensor means 24 and allows air flow to a pyrometer 36. The pyrometer 36 mounts over a second aperture at the outlet end 37 of the pyrometer in a low pressure area of the casing 18. Consequently, high pressure air from the compressor discharge flows into the T3 sensor 24 past the thermocouples 28, through the purge line 32, into the pyrometer 36, then back into the engine flow path 14 in the low pressure turbine, as indicated by arrows 38. The amount of flow is controlled by a throat, or orifice, 40 in the T3 sensor means 24. The pressure ratio between the compressor discharge and the low pressure turbine is always greater than 2.5:1 for engine operating conditions. The system is sized to guarantee choked flow (Mach=1) at the T3 sensor orifice 40 for all engine operating conditions.

Continuing with FIG. 2, the T3 sensing system 22 provides for a more accurate transient T3 signal. The Mach 1 air past the thermocouples 28 maximizes the heat transfer coefficient of the thermocouples, thus minimizing the sensor time constant. By minimizing the sensor time constant, only a small amount of transient compensation is required. Also, the rapidity of the time constant allows greater margin for compensation error without significantly affecting the indicated temperature measurement. Additionally, improved steady-state compensation logic can be established in the ECU due to the constant k value, or ram recovery constant, and maximized thermal time constant.

The ability of the sensor 24 to stop the forward motion of the air and recover the velocity head in terms of total temperature is called ram recovery. This process is never ideal. Hence, every sensing element has a ram recovery factor that is a function of Mach number and the sensor physical characteristics. By maintaining a constant Mach past the sensor, one of the variables is fixed. Therefore, through testing, a consistent k factor, i.e., ram recovery, can be established and input onto the ECU. Consequently, the constant k factor and rapid time constant provide an optimal and repeatable compensation network for the T3 sensing system 22. The T3 sensing system 22 also provides purge flow for the pyrometer 36 site tube 42.

In accordance with the present invention, for a turbofan aircraft engine application, the T3 sensor 24 is mounted near the high pressure compressor discharge axial plane of the engine. The sensor housing 30 is affixed onto the compressor casing 18 by suitable means, such as a plurality of bolts which screw into the compressor casing 18 through the mounting pad 26.

It is seen from the foregoing, that the objectives of the present invention are effectively 10 attained, and, since certain changes may be made in the construction set forth, it is intended that matters of detail be taken as illustrative and not in a limiting sense.

What is claimed is:

1. A compressor discharge temperature sensing system comprising:
    a compressor located within a casing and having a compressor air flow path;
    a sensor contained in a sensor housing and mounted external to the flow path for extracting air external to the compressor casing;
    at least one thermocouple associated with said sensor housing for measuring the air temperature of the extracted air; and
    a purge line associated with an outlet of the sensor for venting the air to a sink pressure to be used as cooling and purge flow.

2. A compressor discharge temperature sensing system as claimed in claim 1 further comprising
    means for sending an electrical signal from the at least one thermocouple to an electronic control unit capable of indicating the air temperature.

3. A compressor discharge temperature sensing system as claimed in claim 2 wherein the at least one thermocouple is contained in the sensor housing.

4. A compressor discharge temperature sensing system as claimed in claim 1 wherein the sensor is mounted adjacent a high pressure compressor discharge area.

5. A compressor discharge temperature sensing system comprising:
    a compressor having a compressor casing and further having compressor discharge via a flow path, the compressor discharge including high pressure air;
    a sensor contained in a sensor housing and mounted external to the flow path for receiving the high pressure air;
    at least one thermocouple mounted in the sensor housing for measuring the high pressure air temperature;
    a purge line located in an associated relation with the sensor to receive the high pressure air;
    means for returning the high pressure air to the flow path; and
    a purge line connected to an outlet of the sensor for venting the air to a sink pressure to be used as cooling and purge flow.

6. A compressor discharge temperature sensing system as claimed in claim 5 wherein the sensor comprises an orifice for controlling amount of air flow.

7. A compressor discharge temperature sensing system as claimed in claim 5 wherein the at least one thermocouple sends an electrical signal to an electronic control unit capable of indicating the air temperature.

8. A method for sensing compressor discharge temperature comprising the steps of:
    providing a compressor located within a casing and having compressor discharge via a flow path, the compressor discharge including high pressure air;
    providing a sensor housed in a sensor housing and mounted external to the flow path for receiving the high pressure air;
    flowing the high pressure air past at least one thermocouple contained in the sensor housing for measuring the high pressure air temperature;
    connecting a purge line to an outlet of the sensor for venting the air to a sink pressure to be used as cooling and purge flow; and
    returning the high pressure air to the flow path.

9. A method for sensing compressor discharge temperature as claimed in claim 8 wherein the sensor comprises an orifice for controlling amount of air flow.

10. A method for sensing compressor discharge temperature as claimed in claim 8 wherein the at least one thermocouple sends an electrical signal to an electronic control unit capable of indicating the air temperature.

* * * * *